(12) United States Patent
Sweeney et al.

(10) Patent No.: US 9,769,036 B1
(45) Date of Patent: Sep. 19, 2017

(54) PORT ASSIGNMENT OF NETWORK DEVICES REFERENCE AND MANAGEMENT

(71) Applicant: VCE Company, LLC, Richardson, TX (US)

(72) Inventors: Denis Sweeney, Los Gatos, CA (US); Colin Ferguson, Watertown, MA (US)

(73) Assignee: VCE IP Holding Company LLC, Richardson, TX (US)

( * ) Notice: Subject to any disclaimer, the term of this patent is extended or adjusted under 35 U.S.C. 154(b) by 190 days.

(21) Appl. No.: 14/521,789

(22) Filed: Oct. 23, 2014

(51) Int. Cl.
G06F 15/173 (2006.01)
H04L 12/26 (2006.01)

(52) U.S. Cl.
CPC ........ H04L 43/045 (2013.01); H04L 43/0876 (2013.01)

(58) Field of Classification Search
USPC .......................... 709/224, 220, 221, 223, 230
See application file for complete search history.

(56) References Cited

U.S. PATENT DOCUMENTS

| | | | | |
|---|---|---|---|---|
| 5,920,705 | A * | 7/1999 | Lyon ................... | H04L 12/4608 370/409 |
| 6,253,240 | B1 * | 6/2001 | Axberg .................. | G06F 8/34 709/223 |
| 2002/0181457 | A1 * | 12/2002 | Mezeul ................... | H04L 45/00 370/389 |
| 2007/0289017 | A1 * | 12/2007 | Copeland .............. | G06F 21/552 726/23 |
| 2010/0138538 | A1 * | 6/2010 | Zheng ..................... | H04L 43/10 709/225 |
| 2013/0080903 | A1 * | 3/2013 | Barda ................. | H04L 63/0236 715/736 |
| 2014/0362294 | A1 * | 12/2014 | Majid .................... | H04N 5/445 348/564 |
| 2015/0256397 | A1 * | 9/2015 | Agarwal ................ | H04L 45/26 370/254 |

* cited by examiner

*Primary Examiner* — Lan-Dai T Truong
(74) *Attorney, Agent, or Firm* — Polsinelli PC (57) ABSTRACT

Implementations of the present disclosure involve an apparatus, device, component, and/or method for management of port assignments of networking devices connected to a network and reference materials associated with the port assignments. In one embodiment, a reference material is provided that illustrates the port assignments for one or more networking devices. The reference material may include a full-color illustration of the network device and a port label near each communication port of the network device. The port label may include a description of the port, a port reference number, and a color-coded reference that provides a quick indication of the type of traffic associated with the port. In addition, one embodiment of the present disclosure may automatically populate the reference material based on information obtained from a network administrator or from the network itself.

19 Claims, 7 Drawing Sheets

PORT ASSIGNMENT OF NETWORK DEVICES REFERENCE AND MANAGEMENT

FIELD OF THE DISCLOSURE

Aspects of the present invention relate to computing devices and, more particularly, aspects of the present invention involve management of port assignments of computing devices connected to a network or other computing devices and reference materials associated with the port assignments.

BACKGROUND

Many industries provide complex products and/or services to customers accompanied by detailed documentation explaining the products and/or services. For example, computing services may include one or more networking devices that interconnect to provide services to the customer over a network. Such computing devices typically include one or more communication ports through which communication between devices may occur. Thus, the documentation accompanying the computing service may include a list of port assignments for the one or more devices that explain the interconnection between the devices. However, port assignment lists may appear in various forms that make understanding of the lists difficult for technicians and customers of the computing services. Further, such devices may be housed in low-light environments, such as data centers, that make reading and understanding of the port assignment lists even more difficult. Also, some host sites, often times referred to as "dark" sites, that include no external network connections to the site may only allow paper documentation describing the network connectivity of the site.

SUMMARY

One implementation of the present disclosure may take the form of a method for generating a reference for a computing device. The method includes the operations of receiving interconnectivity information of the computing device of a network, populating a port assignment reference with a device illustration corresponding to the computing device, the device illustration comprising a representation of the computing device, a plurality of ports associated with the computing device, and a plurality of port labels, wherein each of the plurality of port labels corresponds to and is adjacent at least one of the plurality of ports associated with the computing device. The method further includes providing port traffic text within each of the plurality of port labels of the device illustration, the port traffic text for each of the plurality of port labels corresponding to a type of traffic carried by the corresponding at least one of the plurality of ports to each of the plurality of port labels, based at least on the received interconnectivity information of the computing device, and creating a computer file of the port assignment reference. In addition, the present disclosure may be embodied in a non-transitory computer readable media comprising computer executable instructions to perform a method and/or an apparatus.

DETAILED DESCRIPTION

Implementations of the present disclosure involve an apparatus, device, component, and/or method for management of port assignments of networking devices connected to a computer network and reference materials associated with the port assignments. As used herein, the term "networking device" or "computing device" means any type of computing or processing device, such as a server, a router, a storage device, a personal computer, and the like. In general, it is contemplated that any type of device that includes a processor and transmits and/or receives one or more communication packets to/from another computing device is included as a "networking device" or "computing device".

In one embodiment, a reference material is provided that illustrates the port assignments for one or more computing devices. The reference material may include a full-color or gray-scale illustration of the computing device and a port label near one or more communication ports of the device. The port label may include a description of the port (such as connection information, the type or types of traffic associated with the port, inclusion of the port in a collection of ports, etc.), a port reference number, and a color-coded reference that provides a quick indication of the type of traffic associated with the port. Other information concerning the network, the computing device, and any type of connection information associated with the network may also be included in the reference material. Further, the reference material may be standardized such that sharing of the reference material in an electronic form does not alter the layout of the reference and the information contained in the reference material. In addition, one embodiment of the present disclosure may automatically populate the reference material based on information obtained from a network administrator or from the network itself.

Figure 1:
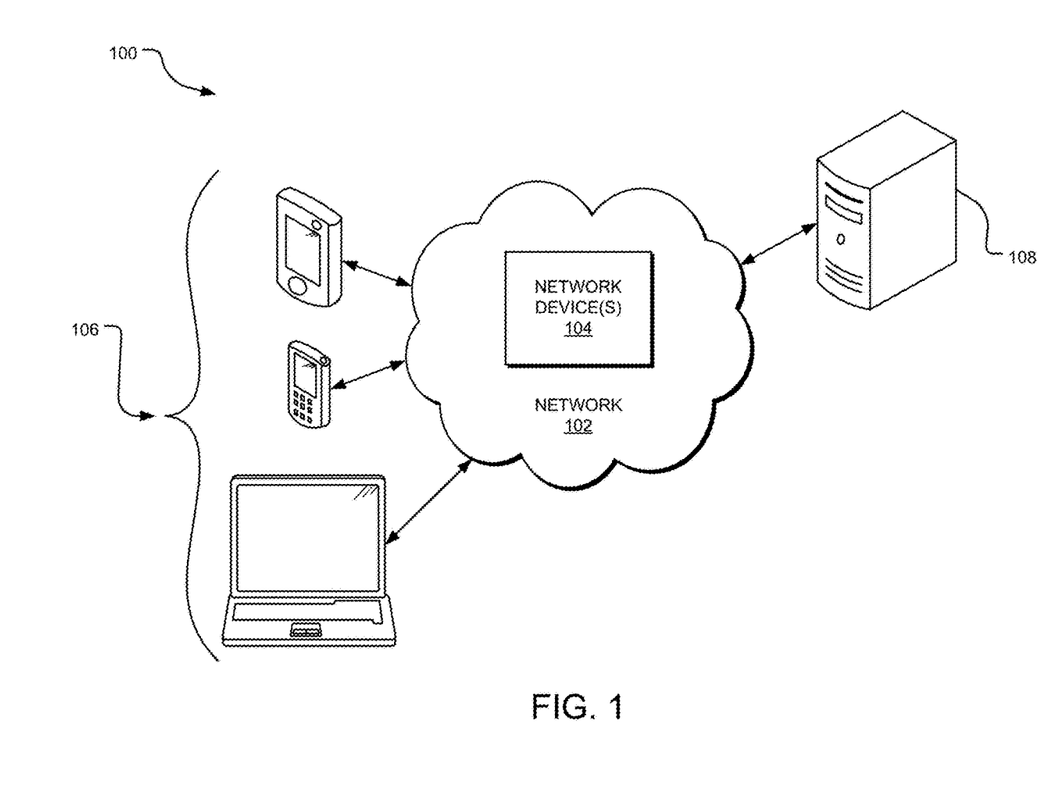
FIG. 1 is a diagram illustrating an example of a computing environment, according to one embodiment of the present disclosure.

FIG. 1 is a diagram illustrating an example of a computing environment 100, according to one embodiment of the present disclosure. The computing environment 100 is but one example of an environment in which a port assignment reference may be useful to an administrator of the network. In general, any type of network, computing device or computing service that utilizes a networking device or other type of computing device with multiple ports may utilize the port assignment reference discussed herein.

As depicted in FIG. 1, a network 102, which may be, without limitation, the Internet, an Intranet, an Ethernet network, a wired network, a wireless network, or the like, is used by one or more computing devices 106 for implementing the system 100. In particular, the network 102 may include a networking device or devices 104 or any other type of computing devices that include multiple communication ports. The ports may allow the networking devices 104 to interconnect to form the network or a portion of the network. In addition, one or more storage devices 108 may be in communication with the network 102 for storing or providing data to the devices of the network. The computing devices connected to the network may include any type of device that includes a processor or other type of processing component.

In one implementation, a user may access the network 102 on a user device 106 communicatively connected to the network 102. Such access to the network 102 may include receiving a port assignment reference of one or more components or devices in the network. In another implementation, a user device 106 may be used to edit or generate the port assignment for one or more of the network devices 104 that may then be used as a reference for one or more of the devices of the network. In this embodiment, the user device 106 may or may not be connected or in communication with the network 102. Regardless of the device used to generate the reference, one or more of the network devices 104 of the network 102 may have an associated port assignment reference that provides a user of the reference a port list for the networking device, as discussed in more detail below.

Figure 2:
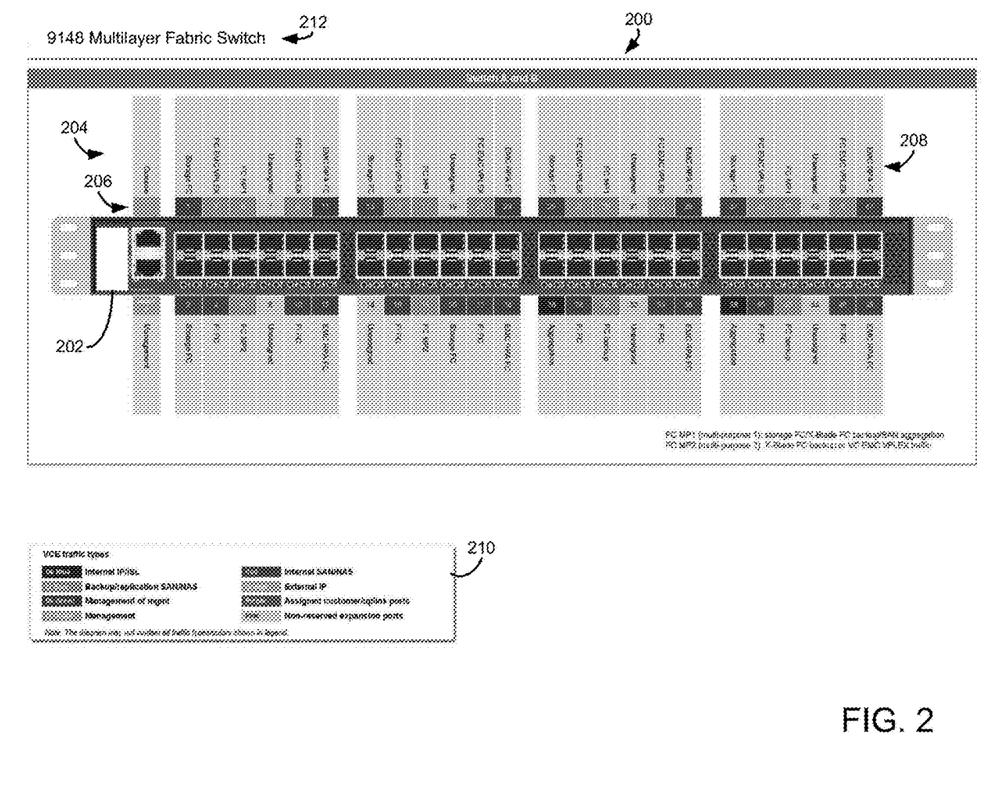
FIG. 2 illustrates an example port assignment reference for a fabric switch computing component, according to one embodiment.

FIG. 2 illustrates an example port assignment reference for a fabric switch networking component, according to one embodiment. In particular, the reference 200 of FIG. 2 may be generated and provided to a network administrator, a network installer, or any person associated with or otherwise interested in the networking device illustrated in the reference. The reference 200 provides information associated with the networking device, such as a port assignment list for the network device illustrating the network traffic assigned to one or more of the physical ports of the device.

The reference 200 includes many aspects that illustrate information concerning a network component of a network. For example, the reference 200 includes an illustration of the network device 202. In one embodiment, the device illustration is a full-color, high-quality illustration of the device. As mentioned above, the device illustrated 202 in the reference 200 may be a component of a network or other type of computing service. For example, the device may be included in a converged infrastructure system provided to a customer. As such, because the device is included in a network or other computing system, information concerning the interconnectivity of the device to other components of the network may be helpful to an operator or installer of the device. Thus, the reference 200 may include the device illustration so that a person utilizing the reference can visually correlate the installed device in the network with the device illustrated 202 in the reference.

To aid in the creation of the reference 200, a computing device utilized to create the reference may include a picture or other type of computer file that matches to one or more network components. For example, a network may be composed of any number of devices or components. A computing device that may be used to create a reference may include a representation or illustration of a component within the network. To create the reference 200, a user or the computing device may select the specific type of component of the reference from a library of available network devices. In some instances, the user or computing device may add additional network devices to the library of available network devices as the network grows or changes over time. As such, the computing device may store an instance or representation of each networking component for which a reference 200 may be created.

In addition, the reference 200 may include labels 212 situated within the reference that provide information concerning the particular device illustrated 202 in the reference. For example, a component label 212 may be included at the top of the reference 200 that provides a specific component label for the device in the network or computing service and/or a generic label that describes the type of device, such as a "switch", "router", "server", etc., including the make and model of the device, in some cases. The label 212 may also indicate when the reference 200 may apply to more than one component of the network. For example, many networks or computing services include redundant services such that, in the event that a component fails, another component may assume the place of the failed component. Thus, the label 212, in some embodiments, may indicate that the reference 200 pertains to more than one component of the network.

The device illustration 202 may visually show one or more physical ports associated with the device. As mentioned above, a computing device utilized to create the reference 200 may include instances or representations of the components of a network. Each representation 202 may include the physical connection ports for the particular component. For example, a switch component may include several connections or ports located on the switch device. As such, the device representation 202 may include indications of the physical ports of the device. These port indicators may look similar to the actual ports of the device (and illustrated as such on the device representation 202), or may be other shapes and sizes that indicate a physical port of the device. As shown in the particular embodiment of the illustration 202 of FIG. 2, the port indicators are arranged in two rows along a face of the device. For some component illustrations, the number of ports of the component may not fit onto a single reference. Thus, in embodiments utilizing such illustrations, additional ports may appear on separate references, called sub-references. Sub-references may or may not have the same characteristics of the other references discussed herein. Further, some components may include swappable subcomponents that may also be shown on one or more sub-references.

Above or below (or otherwise situated near) the physical port indicators in the device illustration 202 is a port label 204 that includes information for the corresponding physical port. As explained in more detail below, the port labels 204 associated with the device illustration 202 may include a description of the port 208 (including connection and/or traffic information), a port number, and a color coding portion 206 that indicates the type of traffic associated with the corresponding port. A close-up view of port labels 204 used in conjunction with the reference 200 is illustrated in FIGS. 3A and 3B.

Figure 3A:
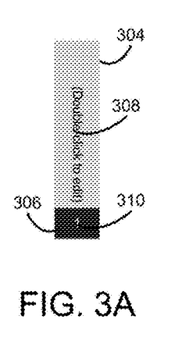
FIGS. 3A and 3B illustrate example port labels included in an example port assignment reference, according to one embodiment.
Figure 3B:
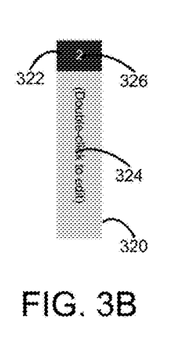

In particular, FIGS. 3A and 3B illustrate example port labels, according to one embodiment. The port labels 304, 320 illustrated in FIGS. 3A and 3B may be included in a port assignment reference 200, such as that shown in FIG. 2. The port labels 304, 320 are configured to receive and display information associated with a physical port of the device illustrated in the reference 200. This information may be utilized by a user of the reference 200 to gain some understanding of the traffic of the port of the device and the interconnectivity of the device in a network.

As discussed above, the port label 304, 320 may extend vertically from the device illustration 202 adjacent to or near the illustration of a port of the device. In particular, the port label 304 of FIG. 3A illustrates a port label that extends toward the top of the reference 200 next to a port indicator and the port label 320 of FIG. 3B illustrates a port label that extends toward the bottom of the reference next to a port indicator. As shown in FIG. 2, the port label 304 of FIG. 3A may be utilized in the reference 200 for ports located near the top of the device 202 and the port label 320 of FIG. 3B may be utilized in the reference for ports located near the bottom of the device.

The port labels 304, 320 include a vertical box, which may or may not be shaded or colored. The vertical box of the label 304, 320 includes contains a description 308, 324 of the port in text. In one embodiment, the text is rotated 90 degrees to provide more room within the label 304, 320 for the port description. During creation of the reference or at a later time, the port description 308, 324 in the label 304, 320 may be edited through a computing device by indicating an edit to the label through an input device to the computing device. For example, a user may use a mouse to click (or double-click) on the label to edit the information contained in the label 304, 320.

The text 308, 324 within the label 304, 320 includes information associated with the port the label is adjacent to. For example, the text 308, 324 may include a name or other identifier of the port, a type of traffic being carried on the port, connection information to another port of this device or another device, status of the port (such as if the port is unassigned or available), and the like. In general, any information about the port may be included in the text 308, 324 of the port label 304, 320. Examples of the type of information that may be included in the port labels 308, 324 are shown in the port labels of the reference 200 of FIG. 2. As shown, the port label may include text 208 that describes the port usage. For example, port number 1 has a label that includes "Storage FC", indicating that the traffic traveling through that port is used for a Fibre Channel (FC) communication with storage devices. Other labels indicate that the port is used for multiple purposes ("FC MP1") or the port is unassigned ("Unassigned"). Again, it is contemplated that any information about the port of the represented device 202 may be included in the port label associated with the port.

In addition, the port labels 304, 320 may be scalable to adjust to the reference 200 size. For example, the reference 200 may be created at any size to provide more room in the reference for information of the device. Similarly, the port labels 304, 320 may also scale along with the size of the reference 200 such that the port labels 304, 320 remain visually associated with the ports of the device. Further, by increasing the size of the reference 200, the area within the port labels 304, 320 for port information may increase. In another embodiment, the text size within the port label 304, 320 may simply scale with the size of the label to increase readability of the information. In yet another embodiment, the port labels 304, 320 may be limited in the smallest the label can scale to maintain readability of the label.

The port labels 304, 320 also include a colored portion 306, 326 located at one end of the label. In particular, the colored portion 306 of the port label 304 of FIG. 3A is located at the bottom of the label and the colored portion 322 of the port label 320 of FIG. 3B is located at the top of the label. In this example, the location of the colored portion 306, 322 of the port labels 304, 320 is adjacent to the port of the device illustration 202. However, in other embodiments, the colored portion 306, 322 of the port labels 304, 320 may be located anywhere within the port labels. In addition, the colored portions 306, 322 may include a port number designator 310, 326 that indicates the particular port number or numbers of the device associated with the port label 304, 320. As should be appreciated, each physical port of a networking device may include a port number or port designator utilized by the device to distinguish the ports. This designator may be included in the colored portion 306, 322 of the port labels 304, 320 for reference by a user of the port assignment reference 200.

Other embodiments of the port label 204 may include additional or other types of visual indicators. For example, the port label 204 may include shading or background patterns (such as cross-hatching, dotted lines, vertical lines, horizontal lines, etc.) to distinguish the port label from other labels of the component. In another embodiment, the port label 204 may include a tactile indicator, such as a raised bumps along the port label that may be felt by the user of the reference 200.

Further, the color portion 306, 322 of the port labels 304, 320 may be indicative of a type of traffic being carried by the port associated with the label. For example and referring back to the reference 200 of FIG. 2, the reference may include a legend 210 that provides an indication of the colors included in the colored portion 306, 322 of the port labels 304, 320 and a traffic type associated with each color. The traffic type color legend 210 of FIG. 2 includes eight different color types, with each color associated with a different type of network traffic. For example, a dark blue color corresponds with Internal Internet Protocol (IP)-type network traffic. A light green color corresponds with Management-type network traffic. From this example, a user of the reference 200 may determine that port labels 204 that include a dark blue color portion 206 indicate that the corresponding port of the device carries internal IP-type network traffic. Similarly, port labels 204 that include a light green color portion 206 indicate that the corresponding port of the device carries management-type network traffic. One or more colors associated with the port labels 204 may also indicate a port that is unused (and/or available for expansion), customer available ports, external IP, storage area network (SAN) traffic, Internal SAN, and the like. In this manner, the color portion 206 of a port label 204 indicates the type of traffic carried on the port corresponding to the label.

Although the above example of the legend 210 includes eight colors (and thereby, eight different traffic types carried by the ports), any number of colors and traffic types may be included in the reference 200. For example, the reference 200 may include four colors associated with one or more of the port labels 204 to distinguish between four types of traffic, or may include ten such colors to distinguish between ten types of traffic. Further, the number and selection of traffic type colors 206 included in the reference 200 may be such that the colors are distinguishable from each other quickly and potentially in low light or by people with color perception difficulties. Thus, similar colors may not be selected for use in the reference 200 to avoid confusion when referring to the reference 200. Also, the legend 210 for a port reference 200 may be standard across several references for the components of a particular network or customer service such that an administrator of the network can quickly understand the color traffic code illustrated in the legend. It should be appreciated that not all of the traffic types/colors in the legend need be included in the corresponding component illustration shown in the reference. Rather, the port labels 204 may include any number of the traffic types/colors of the legend 210. Further, the reference may include an indicator on or near the port of the illustration that indicates when a port is described by a label. In one particular example, the reference may include an orange-colored square on or near each port of the illustration that includes a port label.

In one embodiment of the present disclosure, the port labels, including label color, label text, text size, etc., may be created by a user of the reference based on the user's preference. In addition, the created port labels may be saved in a storage element of a computing device, such as a personal computer. The created port labels may then be available for use in the construction of other references, including the same networking component or other component. In this manner, a library of created port labels may be made available for references of the networking component from the storage element. Similarly, any features of the references, including component illustration, title, etc., may be created and made available for use in creating other references of a network.

Figure 4:
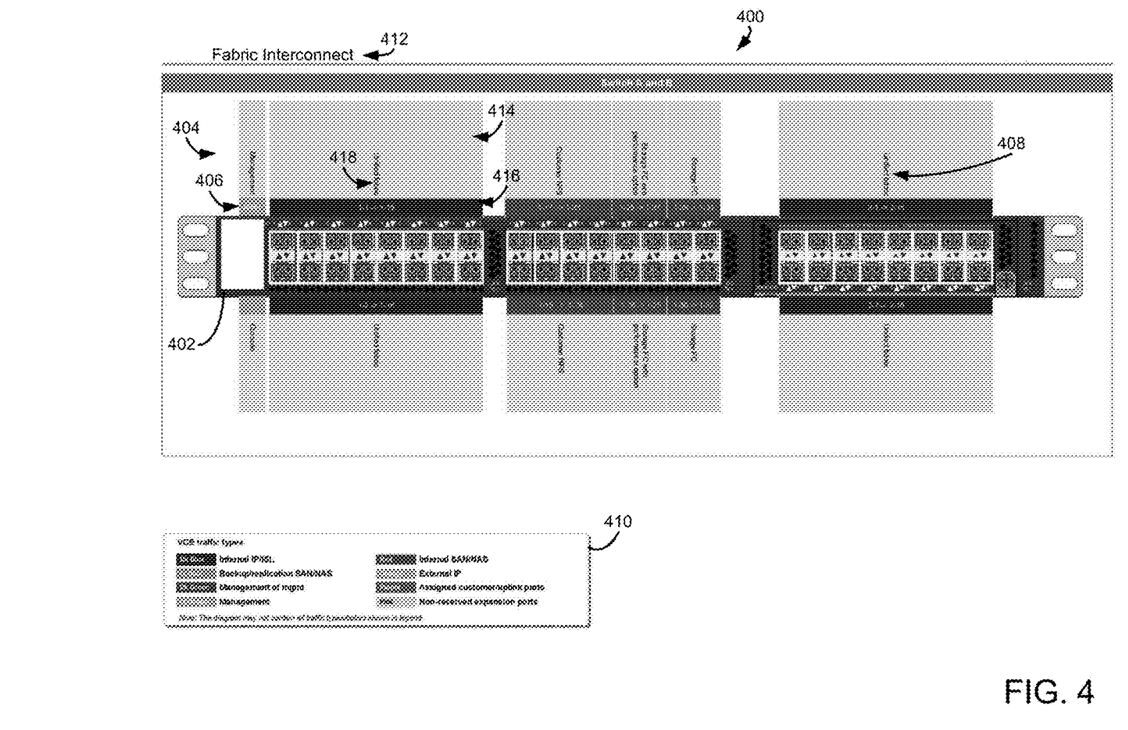
FIG. 4 illustrates an example port assignment reference for a fabric interconnect computing component that includes a stretched port label, according to one embodiment.

In one embodiment, the port labels 204 may be stretched to accommodate the same traffic being carried on a range of adjacent ports. For example, FIG. 4 illustrates an example port assignment reference 400 for a fabric interconnect networking component that includes a stretched port label, according to one embodiment. Similar to the reference 200 of FIG. 2, the reference 400 of FIG. 4 includes a title 412, a device illustration 402 and port labels 404. The port labels 404 of the reference 400 also include a port label 408 and a color portion 406 that indicates a port traffic type being carried on the corresponding port of the device, as indicated by the traffic color legend 410. However, in the reference 400 illustrated in FIG. 4, one or more of the port labels 404 are stretched to be adjacent to a range of ports of the device illustration 402. Such stretched port labels may be used to indicate that the range of ports of the corresponding device carry the same traffic. For example, port label 414 is stretched to correspond to ports 1-1 through 1-15. The port label 414 thus includes a port number in the colored portion 416 of the label that spans ports 1-1 through 1-15 (indicating all odd port numbers between 1-1 through 1-15). In addition, the port label 414 includes a port label text 418 of "Unified fabric" to indicate that all of the ports within the range of the stretched port label are designated to carry unified fabric traffic.

Figure 5:
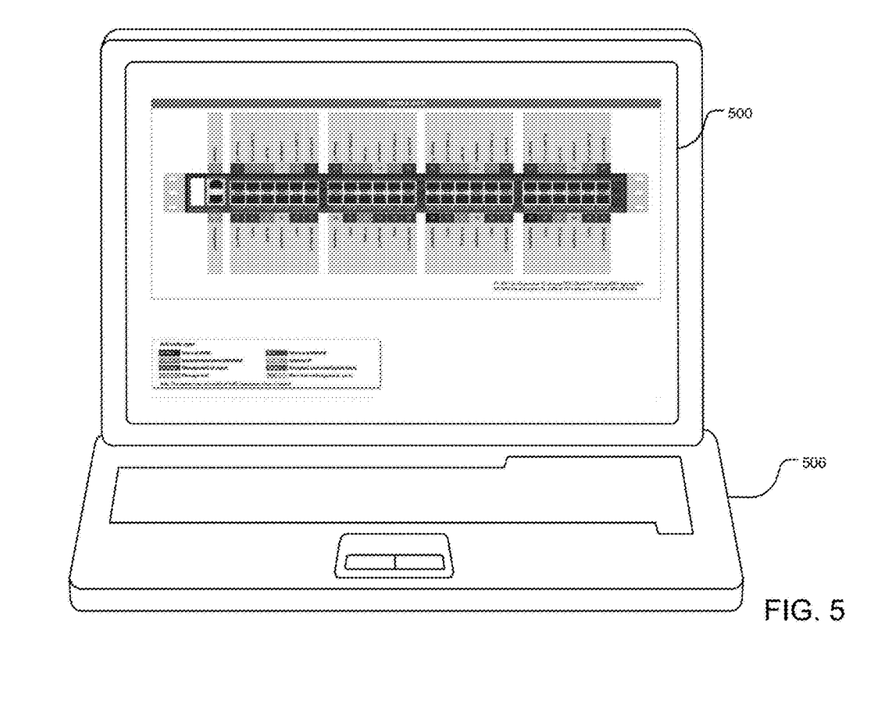
FIG. 5 illustrates an example user interface displaying a port assignment reference, according to one embodiment.

In one embodiment of the present disclosure, the port list reference may be a computer or electronic file that is viewable on a display device, such as a computer screen. FIG. 5 illustrates an example user interface displaying a port assignment reference, according to one embodiment. Thus, through a computing device 506 and associated display device, a user of the reference 500 (such as a network administrator or network engineer) may view the reference on the computing device to understand the network component and the traffic/interconnectivity of the network device in a network. Further, as explained in more detail below, the user of the reference 500 may edit or create the reference utilizing the computing device 506. Further still, in some embodiments, the computing device 506 may populate fields within the reference 500 or otherwise aid in the creation of the reference based on information about the network and networking device obtained by the computing device. In this manner, one or more portions of reference 500 may be created automatically by the computing device, either through importing network information or through one or more macro software programs.

As mentioned above, the reference discussed herein of a computing or networking device may be used by a network administrator to understand the connectivity between one or more components of the network. In addition, the reference may be used by a technician of the network to add in or service one or more components of the network. In yet another example, the reference may be utilized by an installer or field technician of a component of the network to aid in the cabling of the component into a rack or racks of a data center. For example, the reference may be utilized as an input to a robot-type machine or other type of connecting machine configured to cable or otherwise connect components of a network together in response to the information contained in the reference.

Figure 6:
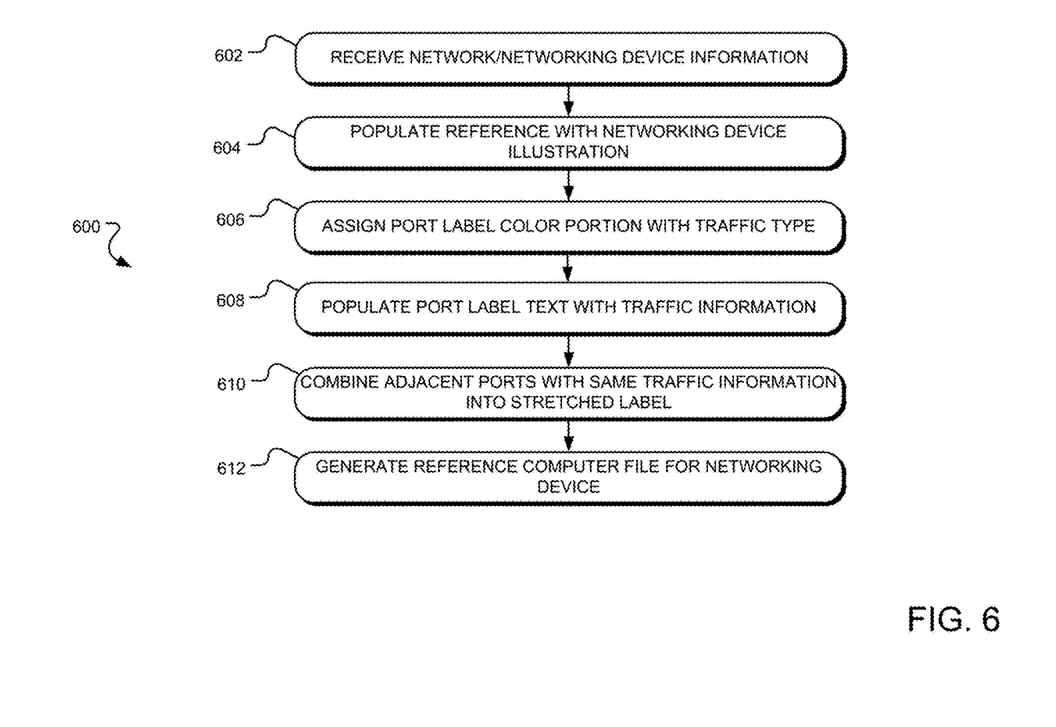
FIG. 6 is a flowchart of a method for automatically generating a port assignment reference for a computing component, according to one embodiment.

FIG. 6 is a flowchart of a method for automatically generating a port assignment reference for a networking component, according to one embodiment. In one embodiment, one or more of the operations of the method of FIG. 6 are performed by a computing device during generation of a port assignment reference, similar to those discussed above. In other embodiments, one or more of the operations of FIG. 6 may be performed by a user of a computing device during generation of the reference.

Beginning in operation 602, the computing device receives information that aids the computing device in generating the reference. For example, the computing device may receive information concerning the network in which a particular networking device is connected. The networking device may be the networking device that is the subject of the generated reference. Such network information may include connectivity information for the networking device to one or more other components in the network. Other information received by the computing device may be information concerning the networking device itself, such as make and model of the device, port lists, interconnectivity of the networking device, and the type of traffic carried by one or more of the ports of the networking device. The information may be received from a database of network or computing services information. In another embodiment, the information may be received from an administrator of the network or computing service.

With the networking information received, the reference may be generated. In particular, in operation 604, the computing device or user of the computing device populates the reference with an illustration of a networking device of the network or computing service. For example, the reference may include an illustration of a server or switch device that is included as a component of the network or computing service. In one embodiment, the illustration is a full-color, high-resolution image of the physical panel or panels of the networking device where the physical ports located. In another embodiment, the illustration is an outline figure of the networking device, including illustrations of the ports of the device.

In operation 606, the computing device and/or user of the computing device populates one or more port labels associated with the illustrated ports of the device illustration with a color portion corresponding to a type of traffic being carried by the port. In one embodiment, the color portions correspond to a color-traffic legend included in the reference. In addition, the color portion may be populated with a port number of the networking device, either automatically based on the selected networking device in the illustration or by the computing device (or user of the computing device) directly. Similarly in operation 608, the computing device and/or user of the computing device populates the text of one or more port labels associated with the reference with information concerning one or more of the ports of the networking device in the device illustration. As discussed above, such port label text may include information about the traffic carried on the port associated with each label, such as internal IP traffic, external IP traffic, management traffic, and the like. Further, port label text may also indicate when a port of the networking device is unassigned or unused for a particular network implementation. In this manner, information pertaining to the ports of the networking device is included in the port labels adjacent to or near the ports of the networking illustration. This information may be utilized by a user of the reference to gain an understanding of the networking device interconnectivity within the network or computing services.

In operation 610, the computing device or user of the computing device combines adjacent ports of the illustrated network device with the same or similar network traffic into one or more stretched port labels. In this manner, adjacent physical ports in the networking device with the same traffic may be illustrated as a group in the reference. In operation 612, the computing device generates the reference with the interconnectivity information included in the reference. The reference may then be used by an administrator or user of the network to gain an understanding of the network infrastructure.

In one embodiment, the reference may be generated through the use of one or more software programs of the computing device. For example, the computing device may include one or more macros or templates executed through a base software platform, such as a drawing program of the computing device. In this embodiment, the port labels may provide a template within the base software program that allows the computing device or user to populate the port labels with the information discussed above. The reference may also include one or more related pages within the reference, such as a title page and index that provides links to one or more of the reference pages within the reference document. In this manner, a user of the computing device or the computing device itself may generate a reference document within the base software program for use by an administrator of a network. Further, the reference may be shared among various computing devices and edited through the base software program. Also, even though the reference document is shared and edited on various computing devices, the reference document may retain a standard layout regardless of the computing device used in editing the document. In addition, the template may include a database of preset port label/color combinations that the user may use to populate the reference.

Figure 7:
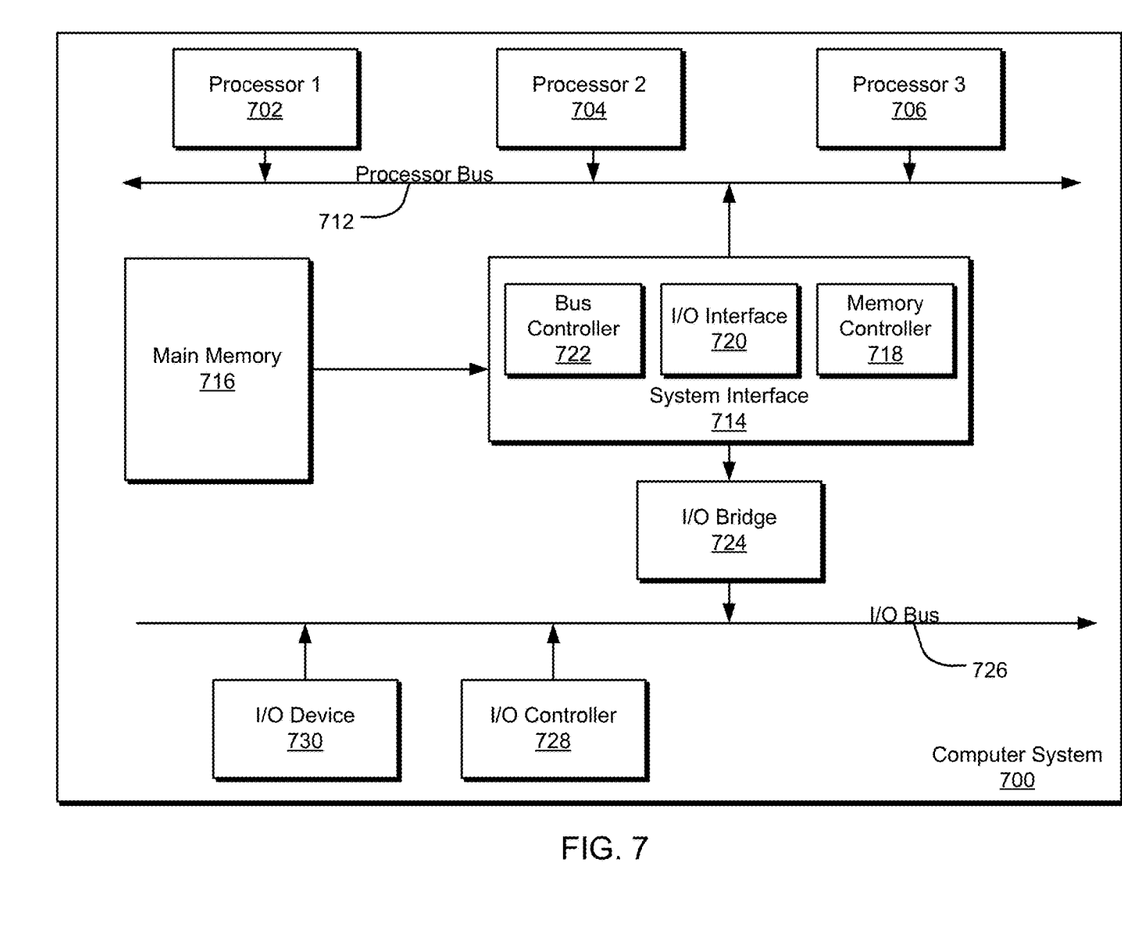
FIG. 7 is a block diagram illustrating an example of a computing system which may be used in implementing embodiments of the present disclosure, according to one embodiment

FIG. 7 is a block diagram illustrating an example of a computing device or computer system 700 which may be used in implementing the embodiments disclosed above. For example, the computing device 700 of FIG. 7 may be used in generating the reference document through one or more of the operations of FIG. 6. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 718 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in a non-transitory computer readable media, such as main memory 716. These instructions may be read into main memory 716 from another non-transitory computer readable media, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A non-transitory computer readable media includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 716. Common forms of machine-readable medium may include, but are not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowchart of FIG. 6 is illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for generating a reference for a networking device, the method comprising:
   receiving interconnectivity information of the networking device of a network;
   populating a port assignment reference with a device illustration corresponding to the networking device, the device illustration comprising a full-color image of the back panel of the networking device, a plurality of ports associated with the networking device located on the full-color image of the back panel of the networking device, and a plurality of port labels, wherein each of the plurality of port labels corresponds to and is adjacent to at least one of the plurality of ports associated with the networking device;
   providing port traffic text within each of the plurality of port labels of the device illustration, the port traffic text for each of the plurality of port labels corresponding to a type of traffic carried by the corresponding at least one of the plurality of ports to each of the plurality of port labels, based at least on the received interconnectivity information of the networking device;
   creating a computer file of the port assignment reference; and
   displaying the port assignment reference on a display device.

2. The method of claim 1 wherein each of the plurality of port labels comprises a color portion corresponding to a type of traffic carried by the corresponding at least one of the plurality of ports.

3. The method of claim 2 wherein the port assignment reference comprises a traffic-color legend, the traffic-color legend comprising a plurality of colors and an associated plurality networking traffic type such that each of the plurality of colors corresponds to a networking traffic type.

4. The method of claim 3 wherein the plurality of colors of the traffic-color legend comprises eight distinct colors.

5. The method of claim 3 wherein at least one of the networking traffic type of the traffic-color legend is customer-specific networking traffic.

6. The method of claim 1 wherein the port traffic text for at least one of the plurality of port labels indicates the corresponding at least one of the plurality of ports is available for future expansion of the networking device within the network.

7. The method of claim 1 wherein the port traffic text for each of the plurality of port labels is editable through inputs received at a computing device.

8. The method of claim 1 wherein at least one of the plurality of port labels corresponds to a subset of the plurality of ports, the subset of the plurality of ports having the same network traffic.

9. The method of claim 1 wherein the networking device is a fabric switch.

10. A non-transitory computer readable media comprising computer executable instructions to perform a method of generating a reference for a networking device comprising:
    receiving interconnectivity information of the networking device of a network;
    populating a port assignment reference with a device illustration corresponding to the networking device, the device illustration comprising a full-color image of the back panel of the networking device, a plurality of ports associated with the networking device located on the full-color image of the back panel of the network device, and a plurality of port labels, wherein each of the plurality of port labels corresponds to and is adjacent to at least one of the plurality of ports associated with the networking device;
    providing port traffic text within each of the plurality of port labels of the device illustration, the port traffic text for each of the plurality of port labels corresponding to a type of traffic carried by the corresponding at least one of the plurality of ports to each of the plurality of port labels, based at least on the received interconnectivity information of the networking device; and
    creating a computer file of the port assignment reference.

11. The non-transitory computer readable media of claim 10 wherein each of the plurality of port labels comprises a color portion corresponding to a type of traffic carried by the corresponding at least one of the plurality of ports.

12. The non-transitory computer readable media of claim 11 wherein the port assignment reference comprises a traffic-color legend, the traffic-color legend comprising a plurality of colors and an associated plurality networking traffic type such that each of the plurality of colors corresponds to a networking traffic type.

13. The non-transitory computer readable media of claim 12 wherein the plurality of colors of the traffic-color legend comprises eight distinct colors.

14. The non-transitory computer readable media of claim 12 wherein at least one of the networking traffic type of the traffic-color legend is customer-specific networking traffic.

15. The non-transitory computer readable media of claim 10 wherein the port traffic text for at least one of the plurality of port labels indicates the corresponding at least one of the plurality of ports is available for future expansion of the networking device within the network.

16. The non-transitory computer readable media of claim 10 wherein the port traffic text for each of the plurality of port labels is editable through inputs received at a computing device.

17. The non-transitory computer readable media of claim 10 wherein at least one of the plurality of port labels corresponds to a subset of the plurality of ports, the subset of the plurality of ports having the same network traffic.

18. The non-transitory computer readable media of claim 10 wherein the networking device is a multilayered switch of a network.

19. A system for generating a reference for a networking device, the system comprising:
    a processing device; and
    a non-transitory computer readable media comprising computer executable instructions that, when executed by the processing device, performs the operations of:
    receiving interconnectivity information of the networking device of a network;
    populating a port assignment reference with a device illustration corresponding to the networking device, the device illustration comprising full-color image of the back panel of the networking device, a plurality of ports associated with the networking device located on the full-color image of the back panel of the network device, and a plurality of port labels, wherein each of the plurality of port labels corresponds to and is adjacent to at least one of the plurality of ports associated with the networking device;

providing port traffic text within each of the plurality of port labels of the device illustration, the port traffic text for each of the plurality of port labels corresponding to a type of traffic carried by the corresponding at least one of the plurality of ports to each of the plurality of port labels, based at least on the received interconnectivity information of the networking device; and creating a computer file of the port assignment reference.

\* \* \* \* \*